United States Patent [19]

White, Jr.

[11] 4,448,696

[45] May 15, 1984

[54] PROCESS FOR RECOVERING AND RECYCLING COAGULANT PRESENT IN WATER TREATMENT SLUDGES

[75] Inventor: A. R. White, Jr., Matthews, N.C.

[73] Assignee: U.S. Environmental Products, Inc., Boca Raton, Fla.

[21] Appl. No.: 351,503

[22] Filed: Feb. 23, 1982

[51] Int. Cl.$^3$ .......................... C02F 1/52; C02F 11/14
[52] U.S. Cl. .................................. 210/711; 210/712; 210/725; 423/132; 423/150
[58] Field of Search ........ 210/711, 712, 716, 724–728, 210/768, 772, 751; 423/123, 128, 130, 132, 141, 146, 150

[56] References Cited

U.S. PATENT DOCUMENTS

| | | | |
|---|---|---|---|
| 1,249,125 | 12/1917 | Langford | 423/132 |
| 2,177,857 | 10/1939 | Bevan | 210/711 |
| 3,377,272 | 4/1968 | Cann | 210/711 |
| 3,959,133 | 5/1976 | Fulton | |
| 4,176,160 | 11/1979 | Pavonet | 210/772 |

OTHER PUBLICATIONS

S. L. Bishop, *Alternate Processes for Treatment of Water Plant Wastes*, 70 Journal of the American Water Works Association (J.A.W.W.A.), 503, (1978).
K. Tamono, *The Art of Water Treatment in Japan*, 69 J.A.W.W.A., 166, (1977).
Committee Report, *Disposal of Water Treatment Plant Wastes*, 64 J.A.W.W.A., 814, (1972).
Committee Report, *Water Treatment Plant Sludges–An Update of the State of the Art: Part 1*, 70 J.A.W.W.A., 498, (1978).
J. T. O'Connor and J. T. Novak, *Management of Water Treatment Plant Residues*, Proceedings A.W.W.A. Seminar on Water Treatment Waste Disposal, (1978).
W. R. Inhoffer, *Filter Washwater and Alum Sludge Disposal a Case Study*, Proceedings A.W.W.A. Seminar on Water Treatment Waste Disposal, (1978).
G. P. Westerhoff, *Minimization of Water Treatment Plant Sludges*, Proceedings A.W.W.A. Seminar on Water Treatment Waste Disposal, (1978).
G. P. Fulton, *Recover Alum to Reduce Waste Disposal Costs*, Processing Water Treatment Plant Sludge, A.W.W.A., (1974).
A. P. Black, B. S. Shuey, and P. J. Fleming, *From Lime–Soda Softening Sludges Recovery of Calcium and Magnesium Values*, 63 J.A.W.W.A., (616), (1971).
D. A. Cornwell and J. A. Susan, *Characteristics of Acid Treated Alum Sludges*, 71 J.A.W.W.A., 604, (1979), (p. 5).
G. P. Westerhoff and D. A. Cornwell, *A New Approach to Alum Recovery*, 70 J.A.W.W.A., 709, (1978), (p. 5).
D. A. Cornwell and R. M. Lemuryan, *Feasibility Studies on Liquid–Ion Exchange for Alum Recovery from Water Treatment Plant Sludges*, 72 J.A.W.W.A., 64, (1980).
C. G. Thompson, J. E. Singley, and A. P. Black, *Magnesium Carbonate–A Recycled Coagulant*, 64 J.A.W.W.A., 11 and 93, (1972).
J. T. Novak and D. C. Calkins, *Sludge Dewatering and Its Physical Properties*, 67 J.A.W.W.A., 42, (1975).
Committee Report, *Water Treatment Plant Sludges–An Update of the State of the Art: Part 2*, 70 J.A.W.W.A., 548, (1978).
G. P. Westerhoff and Martin P. Daly, *Water–Treatment-Plant Wastes Disposal Parts I, II and III*, 66 J.A.W.W.A., 319, 379 and 441, (1974).
A.W.W.A. Research Foundation Report, *Disposal of Wastes from Water Treatment Plants Parts I, II and III*, 61 J.A.W.W.A., 541, 619 and 681, (1969).
J. M. Roberts and C. P. Roddy, *Recovery and Reuse of Alum Sludge at Tampa*, 52 J.A.W.W.A., 857, (1960).
B. H. H. Chen, P. H. King, and C. W. Randall, *Alum Recovery from Representative Water–Treatment–Plant Sludges*, 68 J.A.W.W.A., 204, (1976).
R. M. Gruninger, *Disposal of Waste Alum Sludge from Water Treatment Plants*, 47 Journal of Water Pollution Control Foundation (J.W.P.C.F.), 543, (1975).
D. A. Cornwell and J. Zoltek, Jr., *Recycling of Alum Used for Phosphorous Removal in Domestic Water Treatment*, 49 J.W.B.C.F., 600, (1977), "Cyanamid Alum".
*Water Treatment Sludge Disposal–And a New Method of Coagulant Recovery*, 10, Malcolm Pirnie, Inc., Newsletter, (Apr. 1979).
*Alum Recovery by Liquid–Ion Exchange*, Malcolm Pirnie, Inc.
Palin, A. T., *The Treatment and Disposal of Alum*

*Sludge*, 3 Proceeding Soc. Water Treatment Exam., 131, (1954).

Issac, P. C. and Vahili, I., *The Recovery of Alum Sludge*, 10 Proceedings Soc. Water Treatment Exam., 19, (1969).

Webster, J. A., *Operation and Experimental Experiences at Daer Water Treatment Works, With Special Reference to Use of Activated Silica and the Recovery of Alum from Sludge*, 20 J. Inst. Water Engineering, 167, (1966).

Fulton, G. P., *Alum Recovery for Filter Plant Waste Treatment*, 7 Water Waste Engineering, 78, (1974).

Foster, W. S., *Get the Water Out of Alum Sludge*, 90 Amer. City Council, 83, (1975).

Westerhoff, G. P., *Alum Recycling: An Idea Whose Time has Come?*, 10 Water Wastes Engineering, 28, (1973).

Lindsey, E. E. and Langsome, C., *Recovery and Reuse of Alum from Water Filtration Plant Sludge by Ultrafiltration*, 71 Symp. Service Water AICLE, 185, (1975).

O'Conner, J. T., *Management of Water Treatment Residues*, Water Quality and Treatment, A.W.W.A., (1971).

King, P. H., *Recovery and Reuse of Coagulant from Treatment of Water and Wastewater*, 77 Bulletin Virginia Water Resources Research Center, Blacksburg, Va.

Novak, J. T. and Montgomery, G. E., *Chemical Sludge Dewatering on Sand Beds*, J. Environmental Engineering Division A.S.C.E., 101, No. EE1, (1975).

Gale, R. S., *Filtration Theory with Special Reference to Sewage Sludges*, 66 Water Pollution Control, 622, (1967).

Novak, J. T., *Character and Dewatering Properties of Sludge from Water Treatment*, Water AICLE, (1974).

*Primary Examiner*—Peter A. Hruskoci
*Attorney, Agent, or Firm*—Allegretti, Newitt, Witcoff & McAndrews, Ltd.

[57] ABSTRACT

An improved process for recovering and recycling coagulant present in water treatment sludges. The improvement comprises several steps. First, enough acid is added to the sludge to solubilize most, but not all, of the coagulant in the sludge. Next, the acid-treated sludge is filtered on a non-mechanical horizontal filter to produce the recovered coagulant in solution as the filtrate. The recovered coagulant has a greater coagulative effect, when later recycled to treat raw water, than the mole equivalent of commercial coagulant. A portion of the recovered coagulant is discarded to control the increase in concentration of unwanted impurities in the recovered coagulant. Finally, this process permits neutralization and later removal of the filtered sludge on the surface of the non-mechanical horizontal filter.

21 Claims, 2 Drawing Figures

PROCESS FOR RECOVERING AND RECYCLING COAGULANT PRESENT IN WATER TREATMENT SLUDGES

BACKGROUND OF THE INVENTION

1. Field of the Invention

The present invention relates to an improved process for treating sludge produced by water treatment processes, to recover coagulant used to effect flocculation of solids in the untreated raw water.

Approximately 70% of the water treatment plants in the United States are turbidity removal plants. Water treatment plants utilize coagulants such as aluminum sulfate (alum) and ferric sulfate to remove the turbidity in the raw water. The coagulant added to the raw water reacts with the water's natural or added alkalinity to produce an insoluble base form of the coagulant as a precipitate. This coagulant precipitate removes suspended materials such as silt, dissolved or colloidal organic material, microscopic organisms, and colloidal metallic hydroxides present in the raw water.

After the coagulant precipitate and other suspended solid material (collectively called coagulant-containing sludge) settle, the treated water is separated from the coagulant-containing sludge. Coagulant-containing sludge is generally dilute; typically, the suspended solids content for alum sludges ranges from 1 to 15%. Landfill disposal of alum sludge requires at least 10% to 20% solids content. Currently, the most effective means of sufficiently dewatering alum sludge for disposal is mechanical filter pressing. Although mechanical filter pressing yields dewatered alum sludge possessing at least 30% to 50% solids, the initial equipment cost and subsequent operational costs are high.

The cost of alum sludge disposal is related to its solids content and dewatering characteristics. It is well known that recovery of the alum from the alum sludge improves the dewatering characteristics of the remaining solids and reduces the overall quantity of solids which require disposal. Thus, recovery of alum from the alum sludge reduces the overall disposal costs.

The primary objective of the typical alum recovery process is to acid-solubilize the maximum recoverable amount of alum present in the alum sludge. In an effort to obtain maximum alum recovery, acid is added to achieve a predetermined pH.

One major drawback common to known alum recovery processes involves gradual buildup of impurities in the recycled alum. The addition of acid to the alum sludge converts the base form of the alum to the acid soluble form and simultaneously solubilizes numerous impurities as well, e.g., iron, manganese, and "color." These acid soluble impurities comprise metallic and organic materials as well as impurities commonly present in commercial acid. Repeated alum recovery and recycling operations cause a steady accumulation of acid soluble impurities in the recovered alum. Gradually, the quality of the treated water declines due to contamination with these same acid soluble impurities. Eventually, this situation forces the discarding of all of the recovered alum and total replacement with commercially available coagulant. Fifteen water treatment facilities built in Japan between 1965 and 1972, including five in the Tokyo area, previously used such an alum recovery process. Concern over contamination of treated water by the concentration of acid soluble impurities in the recovered alum evident at these facilities, however, prompted officials to later abandon use of the recovery process at Japanese facilities built after 1972. See, Committee Report, *Water Treatment Plant Sludges-An Update of the State of the Art: Part I,* 70 J. A.W.W.A. 498 (1978).

The second drawback associated with known alum recovery processes is linked to the use of mechanical filter presses to recover the alum from the alum sludge after acid has been added and to dewater the remaining solids. Mechanical filter presses are both expensive to buy and operate. Moreover, removal of the dewatered solids is a slow process requiring extended cessation of the alum recovery process.

2. Description of the Prior Art

U.S. Pat. No. 3,959,133 to Fulton discloses a process which utilizes a mechanical filter press in a vertical configuration to recover the alum from the alum sludge and dewater the remaining solids. To overcome the inherent problem of acid soluble impurity accumulation in the recovered coagulant, Fulton's process requires a complete discarding periodically of the recovered alum and subsequent total replacement with commercially available alum.

Numerous articles have been written which generally describe the principles of alum recovery similar to those discussed in the Fulton patent. One such reference, which describes the Fulton process in detail, is S. L. Bishop, *Alternate Processes for Treatment of Water Plant Wastes,* 70 Journal of the American Water Works Association (J. A.W.W.A.) 503 (1978). Other references discussing principles of alum recovery include: K. Tomono, *The Art of Water Treatment in Japan,* 69 J. A.W.W.A. 166 (1977); Committee Report, *Disposal of Water Treatment Plant Wastes,* 64 J. A.W.W.A. 814 (1972); Committee Report, *Water Treatment Plant Sludges-An Update of the State of the Art: Part 1,* 70 J. A.W.W.A. 498 (1978); J. T. O'Connor and J. T. Novak, *Management of Water Treatment Plant Residues,* Proceedings A.W.W.A. Seminar on Water Treatment Waste Disposal (1978); W. R. Inhoffer, *Filter Washwater and Alum Sludge Disposal a Case Study,* Proceedings A.W.W.A. Seminar on Water Treatment Waste Disposal (1978); G. P. Westerhoff, *Minimization of Water Treatment Plant Sludges,* Proceedings A.W.W.A. Seminar on Water Treatment Waste Disposal (1978); G. P. Fulton, *Recover Alum to Reduce Waste-Disposal Costs,* Processing Water Treatment Plant Sludge A.W.W.A. (1974); A. P. Black, B. S. Shuey, and P. J. Fleming, *From Lime-Soda Softening Sludges Recovery of Calcium and Magnesium Values,* 63 J. A.W.W.A. 616 (1971); and D. A. Cornwell and J. A. Susan, *Characteristics of Acid Treatment Alum Sludges,* 71 J. A.W.W.A. 604 (1979).

Recently, researchers have investigated recovering alum from water treatment plant sludge by liquid-ion exchange. This method uses organic solvents to recover highly pure concentrated alum from sludge by liquid-ion exchange. The liquid-ion exchange is a process step added after acid is added to the alum sludge and is used to eliminate acid soluble impurities from the recovered alum. See G. P. Westerhoff and D. A. Cornwell, *A New Approach to Alum Recovery,* 70 J. A.W.W.A. 709 (1978) and D. A. Cornwell and R. M. Lemuryon, *Feasibility Studies on Liquid-Ion Exchange for Alum Recovery From Water Treatment Plant Sludges,* 72 J. A.W.W.A. 64 (1980). The economics of liquid-ion exchange have yet to be proven.

Thus the prior art in no way suggests an improved, economical coagulant recovery process characterized by freedom from unwanted acid soluble impurity accumulation and utilizing an inexpensive non-mechanical substantially horizontal filtering medium to produce a recovered coagulant filtrate with enhanced coagulative properties.

SUMMARY OF THE INVENTION

The instant invention involves a process for recovering and recycling coagulants from sludge produced by water treatment processes, which sludge contains the base form of the coagulant, acid soluble impurities, and other types of suspended matter. The inventive process comprises the following steps.

First, acid is added to the sludge in sufficient amount to convert most, but not all of the hydroxide form of the coagulant to an acid soluble form, resulting in an acidulated sludge comprising a liquid component containing the acid soluble form of the coagulant and acid soluble impurities, and a solids component containing unsolubilized base form of the coagulant and other suspended matter. The acidulated sludge is then introduced onto the surface of a non-mechanical filtering medium having a substantially horizontal filtering configuration, and the liquid component is filtered through the solids component & optionally also decanted from above the solid component. This yields a recovered coagulant filtrate comprising (i) a recovered soluble form of the coagulant that is a more efficient coagulant, on a mole basis, than the commercially available equivalent, and (ii) some acid soluble impurities; and leaves on the surface of the non-mechanical substantially horizontal filtering medium a solids cake comprising unsolubilized base form of the coagulant, other suspended matter, and entrained liquid component.

A portion of the recovered coagulant filtrate is retained and at least a portion of the retained recovered coagulant filtrate is then recycled to effect flocculation of solids is untreated raw water. A specific amount of the recovered coagulant filtrate is discarded to ensure that the concentration of acid soluble impurities recovered along with the acid soluble form of the coagulant does not exceed the acceptable maximum contaminant level determined for the water treated with the recycled recovered coagulant filtrate.

A neutralizing solution is then introduced onto the solids cake remaining on the surface of the non-mechanical substantially horizontal filtering medium, and the neutralizing solution filters through the solids cake, thereby neutralizing the entrained liquid component and producing a solids cake neutralized sufficiently to permit its subsequent disposal.

A principal object of this invention is to provide a process for recovering and recycling coagulant present in water treatment sludge which possesses enhanced coagulative properties. The problem of less than 100% recovery of used coagulant is minimized because less of the recovered coagulant is required when recycled to treat raw water than if commercial coagulant were used. Therefore, addition of commercial coagulant to the recovered coagulant is greatly reduced. The weight percentage of coagulant remaining unrecovered is offset by the increased coagulative capabilities of the recovered coagulant as well as by the addition of minor amounts of make-up commercial coagulant.

An additional object of this invention is to provide a process for recovering and recycling coagulant present in water treatment sludge which possesses an essentially stable concentration of acid soluble impurities below the acceptable maximum contaminant level for the water treated with the recycled recovered coagulant. This stable concentration eliminates the problem of gradual increases in the concentration of acid soluble impurities each time the coagulant is recovered and recycled which would eventually contaminate the treated water. There is no need to close down the process and discard all the coagulant recovered using this new process simply to avoid problems associated with excessive concentrations of acid soluble impurities in the recovered coagulant.

Another object of this invention is to provide a non-mechanical substantially horizontal filtering medium which permits neutralization of the solids cake easily without removing it from the surface of the filtering medium. As compared with mechanical filter presses, this filtering medium is cheaper to buy and operate, has a greater sludge handling capacity, and requires less shut down time of the coagulant recovery process to permit solids cake disposal.

These and other objects and advantages of the present invention will become apparent from the following description of the preferred embodiments of our invention, described in connection with the accompanying drawings.

BRIEF DESCRIPTION OF THE DRAWINGS

To enable the invention to be more readily understood, two drawings are included in this specification in which.

DESCRIPTION OF THE PREFERRED EMBODIMENTS

The improved coagulant recovery process of this invention involves adding acid to coagulant-containing water treatment sludge sufficient to convert most, but not all, of the hydroxide form of the coagulant potentially recoverable from the sludge to the acid soluble form of the coagulant. A controlled amount of the recovered coagulant filtrate is then discarded. Both these steps combine to stabilize (at steady state) the quantity of acid soluble impurities present in the recovered coagulant filtrate at an acceptable maximum contaminant level determined for the water treated with the recycled recovered coagulant. The acid treated sludge, after it is filtered to recover the acid soluble form of the coagulant, yields a solids cake which is subsequently neutralized and disposed of.

As indicated, the present invention, unlike the typical coagulant recovery process, uses only enough acid to convert a predetermined amount of the hydroxide form of the coagulant to the acid soluble form of the coagulant. Known coagulant recovery processes use significantly more acid since their objective is to convert all of the base form of the coagulant potentially recoverable from the sludge to the acid soluble form of the coagulant. Consequently, most, if not all, of the acid soluble impurities present in the sludge are also dissolved by the excess quantitiy of acid employed in the typical coagulant recovery process. These impurities accumulate in the recovered coagulant, eventually exceeding the acceptable maximum contaminant level for the water treated with the recycled recovered coagulant. By using only enough acid to convert most, but not all, of the hydroxide form of the coagulant to the acid soluble form of the coagulant, and by discarding some of the recovered coagulant each time the recovery process is used, the present invention avoids exceeding the acceptable maximum contaminant level of impurities for the water treated with the recycled recovered coagulant. For any given water treatment system, the exact amounts of acid to be added and of recovered coagulant filtrate to be discarded to avoid exceeding the acceptable maximum contaminant level may be determined by mass balance.

After adding the acid to the coagulant-containing sludge, the sludge is introduced onto a non-mechanical substantially horizontal filtering medium to effect gravity and, at times, vacuum filtration of the sludge. The acid soluble form of the coagulant filters through the layers of suspended solids and remaining unsolubilized base form of the coagulant that form the solids cake on the surface of the non-mechanical substantially horizontal filtering medium. The filtration step produces a solids cake, remaining on the filter surface, and a filtered recovered coagulant filtrate which is low in suspended solids. Optionally the acid-soluble form of the coagulant may also be decanted from above the solids.

The recovered coagulant filtrate, when recycled to effect flocculation of solids in untreated raw water, exhibits enhanced coagulative properties as compared with the stoichiometric mole equivalent of commercial coagulant. Therefore, the same coagulative effect produced by the total amount of commercial coagulant initially used is obtainable using recovered coagulant and make-up commercial coagulant that together amount to less than the initial quantity of commercial coagulant used to treat raw water.

After recovery of the acid soluble form of the coagulant is completed, the solids cake is treated with a neutralizing solution that is applied directly on the cake which is resting on the surface of the non-mechanical substantially horizontal filtering medium. When the pH of the solids cake is raised to a sufficient level to permit disposal, the cake is removed from the filter surface. Thus, filtration of the coagulant-containing sludge, neutralization of the solids cake and further dewatering thereof for disposal all take place conveniently on the same non-mechanical substantially horizontal filtering medium.

Figure 1:
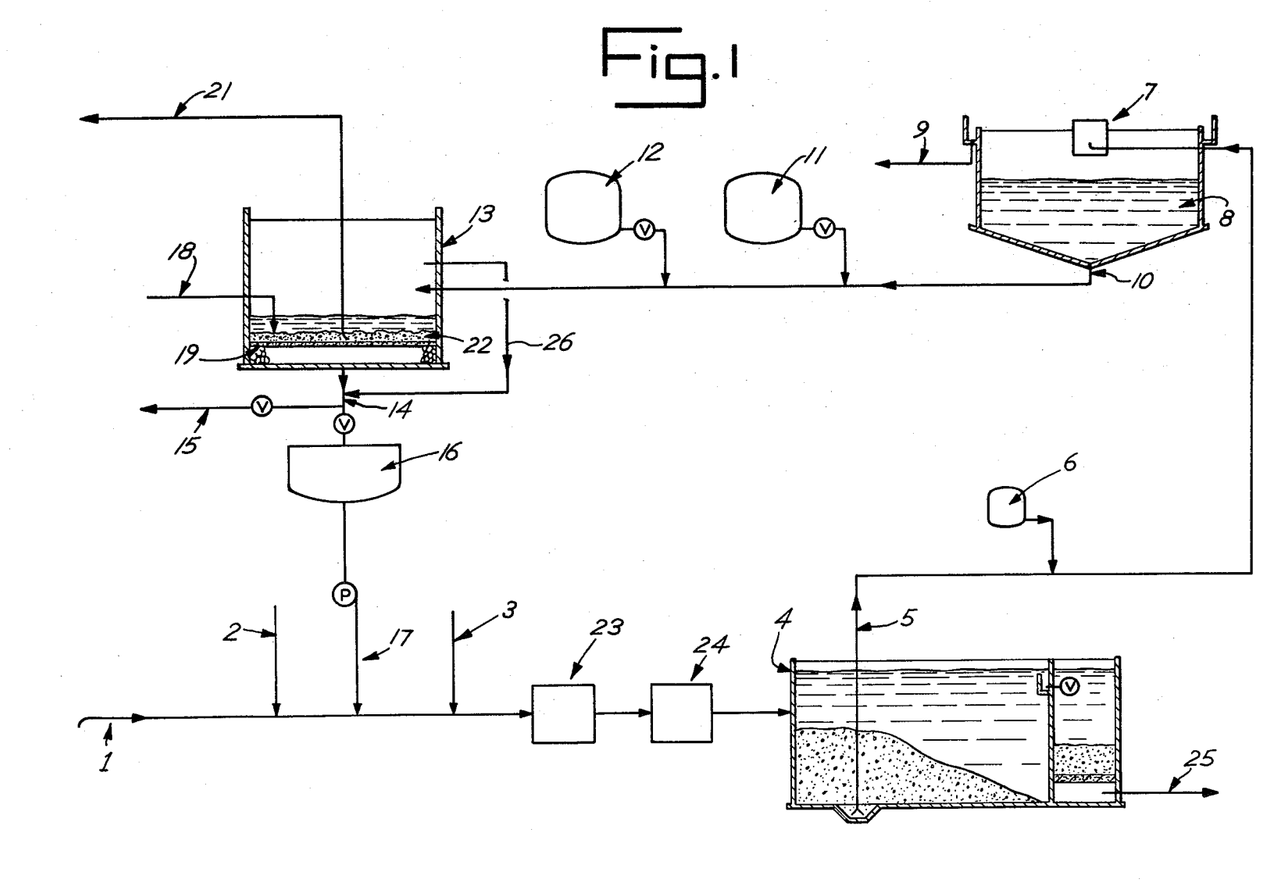
FIG. 1 is a flow diagram depicting operation of a coagulant recovery and sludge dewatering process in accordance with the present invention.

Referring now to the embodiment of the invention shown in FIG. 1, an improved coagulant recovery process is illustrated. In general, the concentrated coagulant-containing water treatment sludge 8 is mixed with acid 11 so that most, but not all, of the hydroxide form of the coagulant potentially recoverable from the sludge is converted to the acid soluble form of the coagulant, producing an acidulated sludge. Then a destabilizing agent 12 is added to the acidulated sludge to destabilize the remaining unsolubilized hydroxide form of the coagulant and suspended solids materials in the coagulant recovery basin 13. "Destabilization", in this context, is a term of art that describes flocculation and coalescence of suspended material in a liquid. The acidulated sludge is then filtered by gravity and, at times, vacuum on the non-mechanical substantially horizontal filtering medium 19. Optionally, the liquid component may also be decanted from above the solids component via 26. A portion of the recovered coagulant filtrate is recycled to effect flocculation of solids in untreated raw water via 17. After the recovery of the acid soluble form of the coagulant is completed, the solids cake 22 is flooded with a neutralizing solution via 18. This solution modifies the pH of liquid entrained in the cake. During this procedure, the solids cake 22 remains on the surface of the filtering medium 19. When the pH of the solids cake 22 is raised to a sufficient extent to permit disposal, it is removed via 21.

The initial step of adding acid to the coagulant-containing water treatment sludge 8 to produce an acidulated sludge involves adding acid 11 to the sludge sufficient to convert most, but not all, of the hydroxide form of the coagulant potentially recoverable from the sludge to the acid soluble form of the coagulant. Using a controlled amount of acid to convert some of the base form of the coagulant potentially recoverable from the sludge reduces the quantity of acid soluble impurities present in the recovered coagulant filtrate and contributes to the stabilization at steady state of the concentration of acid soluble impurities present in the recovered coagulant filtrate below the acceptable maximum contaminant level for the water treated with the recycled recovered coagulant filtrate.

The acidulated sludge placed in the recovery basin 13 on top of the non-mechanical substantially horizontal filtering medium 19 comprises a liquid component containing the acid soluble form of the coagulant and acid soluble impurities, and a solids component containing unsolubilized base form of the coagulant and other suspended matter.

The non-mechanical substantially horizontal filtering medium may have a rigid upper surface, or loose granular upper surface, e.g., a sand bed. The term "non-mechanical" is used in this context particularly to distinguish over mechanical filter press type devices, as well as other mechanical devices. The preferred non-mechanical substantially horizontal filtering medium is a rigid porous structure, most preferably a rigid porous filter plate. The most preferred non-mechanical substantially horizontal filtering media are multi-layer filter plates of the type available from U.S. Environmental Products, Inc., St. Charles, Illinois. These plates are characterized by an upper layer of jagged, irregular hard particles such as aluminum oxide with average particle size increasing from the upper surface to the lower surface of the layer, and a supporting layer of larger particles, with the particles bonded together within each layer and each layer bonded to the other.

The liquid component of the acidulated sludge in the recovery basin 13 is filtered through the solids component, thereby removing undesirable suspended solids. Optionally, the liquid component may also be decanted from above the solids component via 26. The filtering & decanting processes yield a recovered coagulant filtrate at 14 comprising a recovered acid soluble form of the coagulant that is more efficient, on a mole basis, than the commercially available equivalent. When the recovered coagulant filtrate at 14 is later recycled via 17 to effect flocculation of solids is untreated raw water 1, less of the recovered coagulant is necessary to treat a given quantity of raw water than is required when commercial coagulant is utilized. The reason for the enhanced coagulative properties of the recovered coagulant using this new process is unknown at present. Although it is not necessary that the reasons for the operability of an invention be understood so long as it is useful, and while not intending to be bound by any particular explanation, it is believed that filtration of the acid soluble form of the coagulant through the solids component of the acidulated sludge containing unsolubilized base form of the coagulant may cause carry over of some seed crystals of the base form of the coagulant in the recovered coagulant filtrate at 14. These seed crystals may be responsible for enhancing the coagulation of suspended materials in the raw water after the addition of the recovered coagulant filtrate to effect flocculation.

Referring again to FIG. 1, a typical water treatment process and coagulant recovery process may be considered together as an integrated system. Untreated raw water is pumped into the water treatment facility via 1. To effect start-up of the process, commercial coagulant, preferably either aluminum sulfate or ferric sulfate, is initially added via 2 to the raw water to effect flocculation of solids in the untreated raw water. Next, if necessary to achieve optimum flocculation from the coagulant, an alkaline agent, preferably sodium hydroxide or lime, is added via 3 to the water. The water is flash mixed at 23, flocculated at 24, and transferred to a settling tank 4. The treated water then exits the settling tank 4 to filter & exits filter via 25.

The suspended materials and the base form of the coagulant combine to form a dilute coagulant-containing sludge which is collected and removed via 5 from the settling tank 4. The dilute coagulant-containing sludge may be treated with a polymer coagulant 6 before being pumped into the sludge retention tank 7. The selection of a particular polymer coagulant is made on the basis of its cost, availability and proven effectiveness in connection with a given coagulant-containing sludge. The dilute coagulant-containing sludge is concentrated, e.g., over a 2 to 4 hour period, forming a blanket of sludge 8. The supernatant water remaining in the sludge retention tank 7 is decanted via 9 and returned to the raw water intake 1.

The concentrated coagulant-containing sludge is drawn from the retention tank via 10. Acid 11, most preferably sulfuric acid, is added to the sludge to lower the pH of the sludge to preferably 3.9 or less and to convert most, preferably 40% to 70%, but not all, of the hydroxide form of the coagulant to an acid soluble form of the coagulant. The addition of acid produces an acidulated sludge comprising a liquid component containing the acid soluble form of the coagulant and acid soluble impurities, and a solids component containing unsolubilized base form of the coagulant and other suspended matter. It is preferable to add a destabilizing agent 12, preferably a polymer flocculant, to the acidulated sludge prior to transferring the acidulated sludge to the recovery basin 13. The selection of a destabilizing agent or a particular polymer flocculant is again made by testing several types and considering the cost and availability of a particular polymer along with the proven effectiveness of a given polymer in a given coagulant-containing sludge.

The acidulated sludge is introduced onto the surface of a non-mechanical porous filtering medium in a substantially horizontal filtering configuration 19. Again, the non-mechanical substantially horizontal filtering medium may comprise a rigid filter or a loose filter such as a sand bed. The liquid component of the acidulated sludge is filtered through the solids component by gravity and in some cases vacuum filtration is also employed. Optionally, the liquid component may also be decanted from above the solids component via 26. Filtration & decanting yield a recovered coagulant filtrate at 14 comprising (i) a recovered acid soluble form of the coagulant that is a more efficient coagulant, on a mole basis, than the commercially available equivalent, and (ii) some acid soluble impurities; and leaves on the surface of the non-mechanical substantially horizontal filtering medium 19 a solids cake 22 comprising unsolubilized base form of the coagulant, other suspended matter, and entrained liquid component.

Some of the recovered coagulant filtrate at 14, preferably about 70%, is transferred to a storage facility 16, and then recycled via 17 to effect flocculation of solids in untreated raw water. A lesser quantity of commercial coagulant may continue to be added in conjunction with the recycled recovered coagulant filtrate. Some of the recovered coagulant filtrate at 14, preferably about 30%, is discarded to ensure that the concentration of acid soluble impurities recovered along with the acid soluble form of the coagulant does not exceed an acceptable maximum contaminant level for the water treated with the recycled recovered coagulant filtrate.

Following the coagulant recovery process, a neutralizing solution, most preferably consisting of sodium hydroxide, lime, or an aqueous caustic solution, is introduced via 18 onto the surface of the solids cake 22 remaining on the surface of the non-mechanical substantially horizontal filtering medium 19. The solution is drawn through the solids cake 22 by gravity and in some situations by vacuum filtration, thus raising the pH of the entrained liquid component to a level, preferably at least 4.0, sufficient to permit subsequent disposal of the solids cake 22. After the neutralizing solution filtrate is removed via 15, the dewatered solids cake is disposed of via 21.

Figure 2:
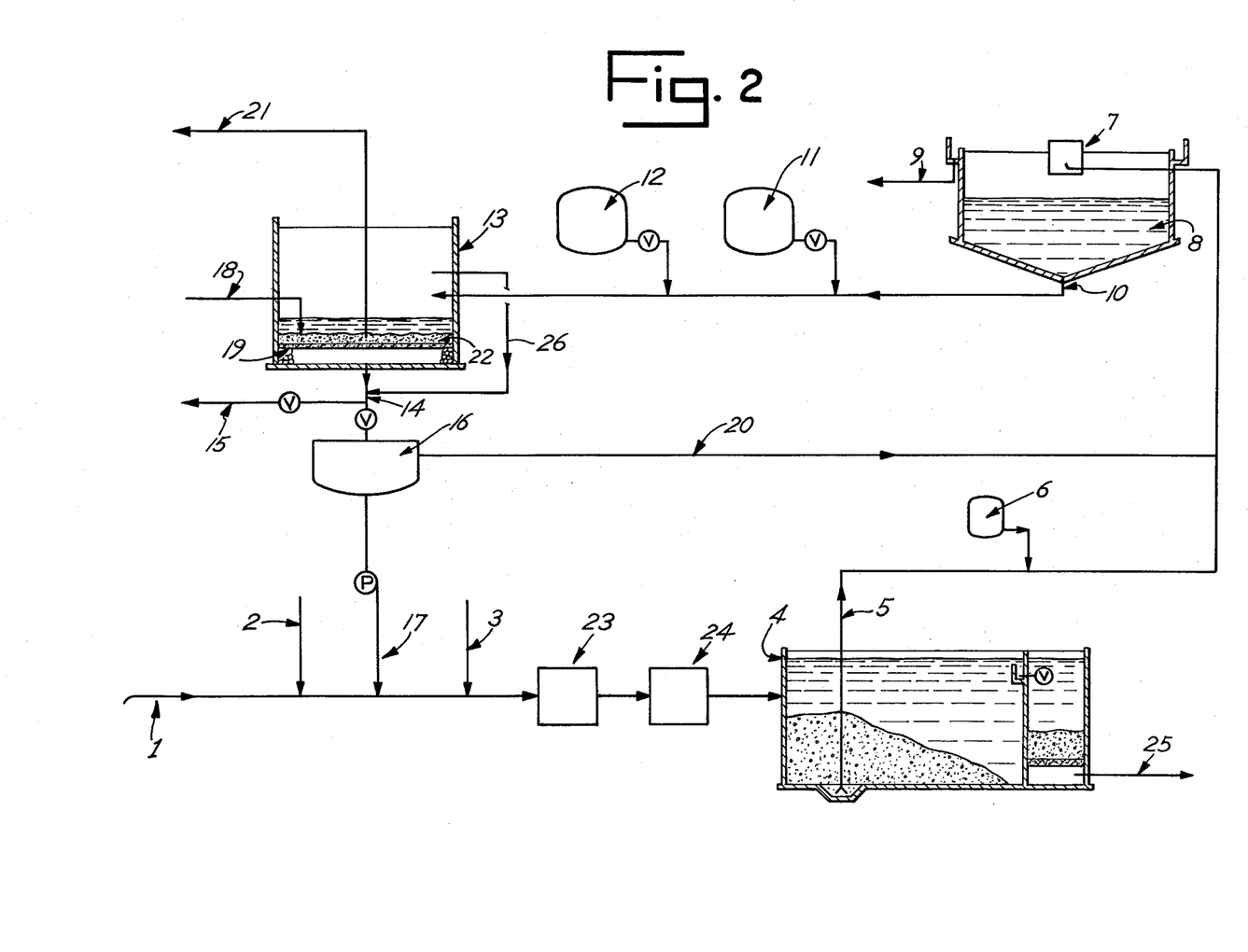
FIG. 2 is a detailed flow diagram of a modification of FIG. 1.

Referring to FIG. 2, a flow diagram illustrating a modification of the coagulant recovery process more particularly relating to the recycling of recovered coagulant filtrate, is shown. In general, the water treatment process in FIG. 2 is the same as that depicted in FIG. 1. In FIG 2, raw water enters the treatment facility via 1 and is mixed initially with commercial coagulant via 2 and later also with recovered coagulant filtrate drawn from the storage facility 16. Again, in FIG. 2 as in FIG. 1, the water containing the coagulant and possibly an alkaline agent is transferred to a settling tank 4 after flash mixing and subsequent flocculation. Then the dilute sludge comprising suspended materials and the base form of the coagulant is collected and removed from the settling tank via 5. After the coagulant containing sludge is concentrated, acid 11 is added to it, then a destabilizing agent, usually a polymer flocculant 12, is added, and the acidulated sludge is placed in the recovery basin 13. Recovery of the acid soluble form of the coagulant by filtration & optionally decanting is accompanied by formation of a solids cake 22 on the surface of the non-mechanical substantially horizontal filtering medium 19. After the neutralizing solution 18 filters through the solids cake 22 and is discarded via 15, the solids cake is taken from the recovery basin 13 and disposed of at 21.

The recovered coagulant filtrate at 14 in FIG. 2 is in part transferred into a storage facility 16 and in part discarded via 15. A portion of the retained recovered coagulant filtrate in the storage facility 16 is recycled as before via 17 to effect flocculation of solids in untreated raw water. As an alternative to storing the remaining retained recovered coagulant filtrate, it is added to the coagulant-containing sludge after settling and prior to addition of acid via 20, and thus, cycled internally within the system without effecting flocculation of solids in untreated raw water.

The improved coagulant recovery process described above yields a recovered acid soluble form of the coagulant that is a more efficient coagulant, on a mole basis, than the commercially available equivalent. Numerous experiments have demonstrated that the recovered coagulant filtrate is often significantly more effective at reducing unwanted color and turbidity in raw water than the commercial equivalent. The results of these experiments are set forth below.

Coagulant Equivalency Test I

In Coagulant Equivalency Test I, the efficiency of a recovered alum (aluminum sulfate) coagulant was compared to commercially available reagent alum. In these tests, a stock solution of reagent alum coagulant at a known concentration and optimum pH was used to reduce the color and turbidity of a one liter sample of raw water through coagulation, flocculation, and settling. Then a test solution of a recovered alum coagulant filtrate to be analyzed was added to a one liter sample of the same type of raw water until the turbidity and color matched those of the water sample treated with the stock reagent alum solution. An alkaline agent was added to the raw water sample to bring the water to the pH level optimum for the coagulant used. The effective percent concentration of the recovered alum, hereinafter termed the "coagulation equivalency percent concentration" was computed by multiplying the percent concentration of the stock reagent alum solution by the ratio of the amount of stock reagent alum used to the amount of test solution of recovered alum used.

The coagulation equivalency percent concentration of the recovered alum is then compared with the calculated stoichiometric percent concentration of recovered alum test solution at the operating pH.

The stoichiometric percent concentration of the recovered alum test solution is calculated by using the following equation:

$$\text{Theoretical Percent Conc. Recovered Alum} = \left(\frac{\text{ml of acid added to sludge sample}}{\text{weight of sludge sample}}\right) \times$$

$$\text{(specific gravity of acid)} \times \text{(\% concentration of acid)} \times$$

$$\left(\frac{\text{Molecular weight of aluminum sulfate}}{3 \times \text{molecular weight of acid}}\right)$$

The stoichiometric percentage concentration of recovered alum test solution should equal the coagulation equivalency percent concentration of recovered alum test solution if the recovered alum solution was as efficient a coagulating agent as the stock reagent alum solution. If the recovered alum test solution was more efficient than the stock reagent alum solution, then the effective coagulation equivalency percent concentration would be greater than the stoichiometric percent concentration of the recovered alum test solution.

Coagulant Equivalency Test I comprises two experiments with recovered alum solutions at different pH's using identical raw water samples of a very clear mountain water with low solids and low alkalinity. (2.0 NTU, 15 pt Co C.U., pH 6.2, total alkalinity equals 20 mg per liter as calcium carbonate). The results are summarized in Tables I and II.

The stoichiometric percentage concentrations of recovered alum calculated at specific pH values for Coagulation Equivalency Test I for the specific raw water sample used are given in Table I.

TABLE I

CALCULATED STOICHIOMETRIC PERCENT CONCENTRATIONS OF RECOVERED ALUM FOR COAGULANT EQUIVALENCY TEST I

| pH of Filtrate Solution (from experimental titration curve) | Quantity of 95.4% Sulfuric Acid Used in ml per liter of Water Sample | Calculated Stoichiometric Percent Concentration of Recovered Alum |
|---|---|---|
| 6.00 | 0.02 ml | 0.007% |
| 3.90 | 0.4 ml | 0.142% |
| 3.65 | 1.0 ml | 0.355% |
| 3.40 | 3.0 ml | 1.065% |
| 2.60 | 4.0 ml | 1.420% |
| 2.20 | 5.0 ml | 1.770% |
| 1.75 | 7.0 ml | 2.480% |

TABLE II

| pH of Recovered Alum | Quantity of 2.5% Stock Reagent Alum Used Per Liter of Raw Water | Quantity of Recovered Alum Used Per Liter of Raw Water | Coagulation Equivalency Percent Concentration Of Recovered Alum Test Solution |
|---|---|---|---|
| 2.60 | 10 ml | 15 ml | 1.67% |
| 1.80 | 4.0 ml | 3.0 ml | 3.33% |

The data in Table II, taken in conjunction with the data in Table I, demonstrate that the recovered alum test solution at a pH of 2.60 produced a coagulative effect in raw water corresponding to a coagulation equivalency percent concentration of 1.67% while the calculated stoichiometric percent concentration for the recovered alum test solution was 1.42%. That is, the 1.42% recovered alum test solution had the same coagulative properties as a stock reagent alum solution of 1.67%. Therefore, the recovered alum test solution at pH of 2.60 was 18% more efficient than the stock reagent alum solution.

Similarly, the recovered alum test solution at a pH of 1.80 produced a coagulative effect in raw water corresponding to a coagulation equivalency percent concentration of 3.33% while the calculated stoichiometric percent concentration for the recovered alum test solution was 2.48%. Therefore, the recovered alum test solution at pH of 1.80 was 34% more efficient than the stock reagent alum solution.

Coagulant Equivalency Test II

In Coagulation Equivalency Test II, the efficiency of the recovered alum coagulant was compared to commercially available stock reagent alum in several experiments. These experiments were conducted in the same manner as the experiments discussed in Coagulant Equivalency Test I. However, the raw water sample tested was obtained from a source different from that used in Coagulant Equivalency Test I. The raw water used in Coagulant Equivalency Test II was a surface water typical of the waters in the United States Piedmont. (20 NTU, 30 pt Co C.U., pH 6.8, total alkalinity equals 60 mg per liter as calcium carbonate).

The calculated stoichiometric percent concentrations in Coagulant Equivalency Test II of recovered alum coagulant for various specific pH values were calculated using the same equation set out in detail in Coagulant Equivalency Test I and are given in Table III.

TABLE III
CALCULATED STOICHIOMETRIC PERCENT CONCENTRATIONS OF RECOVERED ALUM FOR COAGULANT EQUIVALENCY TEST II

| pH of Filtrate Solution (from experimental titration curve) | Quantity of 95.4% Sulfuric Acid Used in ml per liter of water sample | Calculated Stoichiometric Percent Concentration of Recovered Alum |
| --- | --- | --- |
| 4.0 | 2.48 | 0.88% |
| 3.9 | 3.08 | 1.09% |
| 3.8 | 3.67 | 1.30% |
| 3.6 | 6.26 | 2.22% |
| 3.3 | 7.05 | 2.50% |
| 2.6 | 8.44 | 3.00% |
| 2.2 | 9.43 | 3.35% |
| 1.9 | 10.43 | 3.70% |
| 1.7 | 11.42 | 4.05% |
| 1.4 | 13.41 | 4.76% |

Coagulant Equivalency II consists of four experiments with recovered alum solutions at different pH's. The results of these experiments are summarized in Table IV.

TABLE IV

| pH of Recovered Alum | Quantity of 2.5% Stock Reagent Alum Used Per Liter of Raw Water | Quantity of Recovered Alum Used Per Liter of Raw Water | Coagulation Equivalency Percent Concentration Of Recovered Alum Test Solution |
| --- | --- | --- | --- |
| 2.5 | 5.0 ml | 2.7 ml | 4.63% |
| 2.3 | 5.0 ml | 2.1 ml | 6.0% |
| 3.5 | 6.4 ml | 2.9 ml | 5.5% |
| 3.9 | 7.1 ml | 3.5 ml | 5.1% |

What the data in Table IV, taken in conjunction with the data in Table III, demonstrate is that the recovered alum test solution at a pH of 2.5 produced a coagulative effect in raw water corresponding to a coagulation equivalency percent concentration of 4.63%, while the calculated stoichiometric percent concentration for the recovered alum test solution was 3.1% (by interpolation). That is, the 3.1% recovered alum test solution had the same coagulative properties as a 4.63% commercial stock reagent alum solution. Therefore, the recovered alum test solution at a pH of 2.5 was 49% more efficient than the commercial stock reagent alum solution.

Similarly, the recovered alum test solutions at pH values of 2.3, 3.5 and 3.9 demonstrated enhanced coagulative properties when compared with the commercial stock reagent alum solution. The recovered alum test solutions were 80%, 140%, and 360% more efficient at pH values of 2.3, 3.5 and 3.9 respectively. Again, the results of the experiments listed under Coagulant Equivalency Test II provide further evidence that recovered alum coagulant produced by the new improved recovery process described herein possesses enhanced coagulative properties. Moreover, since the experiments of Coagulant Equivalency Test II utilized a raw water souce different from that used for experiments of Coagulant Equivalency Test I, the experiments show that the enhanced coagulative properties of the recovered alum solution were not a function of using a particular raw water.

Coagulant Equivalency Test III

In Coagulant Equivalency Test III, the efficiency of the recovered alum coagulant was compared to commercially available stock reagent alum in several experiments. These experiments were conducted in the same manner as the experiments discussed in Coagulant Equivalency Tests I and II. However, the raw water sample tested was obtained from a source different from that used in either Coagulant Equivalency Tests I or II. The raw water used in Coagulant Equivalency Test III was a surface water typical of a highly colored United States coastal "swamp" water. (10 NTU, 150 pt Co C.U., pH 6.6, total alkalinity equals 10 mg per liter as calcium carbonate).

The calculated stoichiometric percent concentration of recovered alum coagulant in Coagulant Equivalency Test III for various specific pH values was calculated using the same equation set out in detail in Coagulant Equivalency Test I and is given in Table V.

TABLE V
CALCULATED STOICHIOMETRIC PERCENT CONCENTRATIONS OF RECOVERED ALUM FOR COAGULANT EQUIVALENCY TEST III

| pH of Filtrate Solution (from experimental titration curve) | Quantity of 95.4% Sulfuric Acid Used in ml per ¼ liter of water sample | Calculated Stoichiometric Percent Concentration of Recovered Alum |
| --- | --- | --- |
| 4.0 | 0.15 | 0.21% |
| 3.8 | 0.20 | 0.28% |
| 3.5 | 0.70 | 0.99% |
| 3.3 | 1.00 | 1.42 |
| 3.2 | 1.20 | 1.70% |
| 3.0 | 1.80 | 2.56% |
| 2.8 | 2.20 | 3.12% |
| 2.5 | 2.50 | 3.55% |
| 2.0 | 3.00 | 4.26% |
| 1.6 | 3.68 | 5.21% |

Coagulant Equivalency Test III consists of seven experiments with recovered alum solutions at different pH's. The results of these experiments are summarized in Table VI.

TABLE VI

| pH of Recovered Alum | Quantity of 2.5% Stock Reagent Alum Used Per Liter of Raw Water | Quantity of Recovered Alum Used Per Liter of Raw Water | Coagulation Equivalency Percent Concentration Of Recovered Alum Test Solution |
| --- | --- | --- | --- |
| 3.1 | 15.0 ml | 9.5 ml | 3.9% (80% more efficient) |
| 3.8 | 13.0 ml | 9.5 ml | 3.5% (1150% more efficient) |
| 3.8 | 7.0 ml | 7.0 ml | 2.5% (800% more efficient) |
| 3.4 | 3.6 ml | 3.6 ml | 2.5% (100% more efficient) |
| 3.8 | 8.0 ml | 7.0 ml | 2.8% (900% more efficient) |
| 3.1 | 3.6 ml | 1.7 ml | 5.3% (150% more efficient) |
| 2.6 | 7.25 ml | 2.1 ml | 8.6% (150% more efficient) |

(The variation among the tabulated results is attributable to performance of the tests on different dates by different experimenters, and the experimental error is well within limits acceptable in the waterworks industry.)

The data listed in Table VI, taken in conjunction with the data in Table V, demonstrate that the recovered alum test solutions of various pH values evaluated in these experiments again produced enhanced coagulative effects. Additionally, it demonstrates again that the coagulative properties associated with recovered alum coagulant produced by the new improved recovery process described herein are not a phenomenon associated with the specific raw water treated.

The experimental results reported in Coagulant Equivalency Tests I-III provide evidence that coagulant recovered using the new recovery process described herein consistently provides greater coagulation properties than the mole equivalent of commercial or reagent grade alum. Moreover, this enhanced coagulative property of the recovered alum is effective in treating a variety of typical raw water samples generally encountered in the field of water treatment. It is believed than analogous results can be achieved with ferric sulfate coagulant.

It should be understood that the foregoing disclosure emphasizes certain specific embodiments of the invention and that all modifications or alternatives equivalent thereto are within the spirit or scope of the invention as set forth in the appended claims.

What is claimed is:

1. An improved raw water treatment process of the type involving mixing an aluminum or iron coagulant and an alkaline agent with untreated raw water to effect flocculation of solids in the water and formation of a sludge containing the hydroxide form of the coagulant, separating the coagulant containing sludge from the water, and concentrating and dewatering the sludge, wherein the improvement comprises:
   (a) adding acid to the sludge sufficient to lower the pH of the sludge to about 3.9 or less and to convert an amount of the hydroxide form of the coagulant to an acid soluble form, resulting in an acidulated sludge comprising a liquid component containing the acid soluble form of the coagulant and acid soluble impurities, and a solids component containing unsolubilized hydroxide form of the coagulant and other suspended matter;
   (b) introducing the acidulated sludge onto the surface of a non-mechanical substantially horizontal filtering medium;
   (c) filtering the liquid component through the solids component on the filtering medium yielding a recovered coagulant filtrate comprising (i) a recovered soluble form of the coagulant that is a more efficient coagulant, on a mole basis, than the commercially available coagulant and (ii) some acid soluble impurities; and leaving on the surface of the nonmechanical substantially horizontal filtering medium a solids cake comprising unsolubilized hydroxide form of the coagulant, other suspended matter, and entrained liquid component;
   (d) retaining a portion of the recovered coagulant filtrate and recycling at least a portion of the retained recovered coagulant filtrate, which is less than the molar equivalent of the commercially available coagulant which would otherwise be required, to effect flocculation of solids in untreated raw water; and
   (e) discarding an amount of the recovered coagulant filtrate sufficient to ensure that the concentration of acid soluble impurities recovered along with the acid soluble form of the coagulant does not exceed an acceptable maximum contaminant level for the water treated with the recycled recovered coagulant filtrate;
   the amount of the hydroxide form of the coagulant that is converted to an acid soluble form being equal to or less than the amount necessary to ensure that the concentration of acid soluble impurities in the recycled recovered coagulant filtrate does not exceed the acceptable maximum contaminant level for the water treated with the recycled recovered coagulant filtrate.

2. A raw water treatment process as in claim 1 wherein the coagulant used to treat the raw water is aluminum sulfate.

3. A raw water treatment process as in claim 1 wherein the coagulant used to treat the raw water is ferric sulfate.

4. A raw water treatment process as in claim 1 wherein the acid added to the sludge is sulfuric acid.

5. A raw water treatment as in claim 1 wherein the step of adding acid to the sludge is followed by adding a polymer flocculant to the acidulated sludge.

6. A raw water treatment process as in claim 1 wherein about 70% of the recovered coagulant filtrate is retained in a storage facility for recycling to effect flocculation of solids in the untreated raw water and about 30% of the recovered coagulant filtrate is discarded.

7. A raw water treatment process as in claim 1 wherein all of the retained recovered coagulant filtrate is recycled to effect flocculation of solids in untreated raw water.

8. A raw water treatment process as in claim 1 wherein a portion of the retained recovered coagulant filtrate is added to the sludge before the sludge is treated with acid.

9. A raw water treatment process as in claim 1 wherein the non-mechanical substantially horizontal filtering medium is a rigid porous filter plate.

10. A process for recovering and recycling aluminum or iron coagulants from sludge which contains the hydroxide form of the coagulant, acid soluble impurities, and other types of suspended matter and that is produced by water treatment processes comprising the steps of:
   (a) adding acid to the sludge sufficient to lower the pH of the sludge to about 3.9 or less and to convert an amount of the hydroxide form of the coagulant to an acid soluble form, resulting in an acidulated sludge comprising a liquid component containing the acid soluble form of the coagulant and acid soluble impurities, and a solids component containing unsolubilized hydroxide form of the coagulant and other suspended matter;
   (b) intorducing the acidulated sludge onto the surface of a non-mechanical substantially horizontal filtering medium;
   (c) filtering the liquid component through the solids component yielding a recovered coagulant filtrate comprising
      (i) a recovered soluble form of the coagulant that is a more efficient coagulant, on a mole basis, than the commercially available equivalent, and (ii)

some acid soluble impurities; and leaving on the surface of the non-mechanical substantially horizontal filtering medium a solids cake comprising unsolubilized hydroxide form of the coagulant, other suspended matter, and entrained liquid component;

(d) retaining a portion of the recovered coagulant filtrate and recycling at least a portion of the retained recovered coagulant filtrate which is less than the molar equivalent of the commercially available coagulant which would otherwise be required, to effect flocculation of solids in untreated raw water; and (e) discarding an amount of the recovered coagulant filtrate sufficient to ensure that the concentration of acid soluble impurities recovered along with the acid soluble form of the coagulant does not exceed an acceptable maximum contaminant level for the water treated with the recycled recovered coagulant filtrate;

the amount of the hydroxide form of the coagulant that is converted to an acid soluble form being equal to or less than the amount necessary to ensure that the concentration of acid soluble impurities in the recycled recovered coagulant filtrate does not exceed the acceptable maximum contaminant level for the water treated with the recycled recovered coagulant filtrate.

11. A process for recovering and recycling coagulant as in claim 10 wherein the coagulant used to treat the raw water is aluminum sulfate.

12. A process for recovering and recycling coagulant as in claim 10 wherein the coagulant used to treat the raw water is ferric sulfate.

13. A process for recovering and recycling coagulants as in claim 10 wherein the acid added to the sludge is sulfuric acid.

14. A process for recovering and recycling coagulant as in claim 10 wherein the step of adding acid to the sludge is followed by adding a polymer flocculant to the acidulated sludge.

15. A process for recovering and recycling coagulant as in claim 10 wherein about 70% of the recovered coagulant filtrate is retained in a storage facility for recycling to effect flocculation of solids in the untreated raw water and about 30% of the recovered coagulant filtrate is discarded.

16. A process for recovering and recycling coagulant as in claim 10 wherein all of the retained recovered coagulant filtrate is recycled to effect flocculation of solids in untreated raw water.

17. A process for recovering and recycling coagulant as in claim 10 wherein a portion of the retained recovered coagulant filtrate is added to the sludge before the sludge is treated with acid.

18. A process for recovering and recycling coagulant as in claim 10 wherein the non-mechanical substantially horizontal filtering medium is a rigid porous filter plate.

19. A process for recovering and recycling a coagulant selected from the group consisting of aluminum sulfate and ferric sulfate from sludge which contains the hydroxide form of the coagulant, acid soluble impurities, and other types of suspended matter and that is produced by water treatment processes, comprising the steps of:

(a) adding sulfuric acid to the sludge sufficient to lower the pH of the sludge to about 3.9 or less and to convert an amount of the hydroxide form of the coagulant to an acid soluble form, resulting in an acidulated sludge comprising a liquid component containing the acid soluble form of the coagulant and acid soluble impurities, and a solids component containing unsolubilized hydroxide form of the coagulant and other suspended matter;

(b) adding a polymer flocculant to the acidulated sludge to flocculate the solids component;

(c) introducing the acidulated sludge onto the surface of a non-mechanical substantially horizontal rigid porous filtering medium;

(d) filtering the liquid component through the solids component yielding a recovered coagulant filtrate comprising
(i) a recovered soluble form of the coagulant that is a more efficient coagulant, on a mole basis, than the commercially available equivalent, and (ii) some acid soluble impurities; and leaving on the surface of the filtering medium a solids cake comprising unsolubilized hydroxide form of the coagulant, other suspended matter, and entrained liquid component;

(e) retaining about 70% of the recovered coagulant filtrate and recycling it to effect flocculation of solids in the untreated raw water, and discarding about 30% of the recovered coagulant filtrate to ensure that the concentration of acid soluble impurities recovered along with the acid soluble form of the coagulant does not exceed an acceptable maximum contaminant level for the water treated with the recycled recovered coagulant filtrate; and (f) adding an amount of commercially available coagulant as make-up which is less than would otherwise be required, as a result of the greater efficiency, on a mole basis, of the recovered coagulant filtrate as compared with the commercially available equivalent;

the amount of the hydroxide form of the coagulant that is converted to an acid soluble form being equal to or less than the amount necessary to ensure that the concentration of acid soluble impurities in the recycled recovered coagulant filtrate does not exceed the acceptable maximum contaminant level for the water treated with the recycled recovered coagulant filtrate.

20. A process for recovering and recycling an aluminum or iron coagulant from sludge that contains the hydroxide form of the coagulant, acid soluble impurities, and other types of suspended matter and which is produced by water treatment processes comprising the steps of:

(a) adding acid to the sludge sufficient to lower the pH of the sludge to about 3.9 or less and to convert 40% to 70% of the hydroxide form of the coagulant to an acid soluble form, resulting in an acidulated sludge comprising a liquid component containing the acid soluble form of the coagulant and acid soluble impurities and a solids component containing unsolubilized hydroxide form of the coagulant and other suspended matter;

(b) introducing the acidulated sludge onto the surface of a non-mechanical substantially horizontal filtering medium;

(c) filtering the liquid component through the solids component yielding a recovered coagulant filtrate comprising
(i) a recovered soluble form of the coagulant that is a more efficient coagulant, on a mole basis, than the commercially available equivalent, and (ii) some acid soluble impurities; and leaving on the surface of the non-mechanical substantially horizontal filtering medium a solids cake comprising unsolubilized hydroxide form of the coagulant, other suspended matter, and entrained liquid component;

(d) retaining a portion of the recovered coagulant filtrate and recycling a least a portion of the retained recovered coagulant filtrate which is less than the molar equivalent of the commercially available coagulant which would otherwise be required to effect flocculation of solids in untreated raw water; and (e) discarding an amount of the recovered coagulant filtrate sufficient to ensure that the concentration of acid soluble impurities recovered along with the acid soluble form of the coagulant does not exceed an acceptable maximum contaminant level for the water treated with the recycled recovered coagulant filtrate.

21. An improved raw water treatment process of the type involving mixing an aluminum or iron coagulant and an alkaline agent with untreated raw water to effect flocculation of solids in the water and formation of a sludge containing the hydroxide form of the coagulant, separating the coagulant containing sludge from the water, and concentrating and dewatering the sludge, wherein the improvement comprises:

(a) adding acid to the sludge sufficient to lower the pH of the sludge to about 3.9 or less and to convert an amount of the hydroxide form of the coagulant to an acid soluble form, resulting in an acidulated sludge comprising a liquid component containing the acid soluble form of the coagulant and acid soluble impurities, and a solid component containing unsolubilized hydroxide form of the coagulant and other suspended matter;

(b) introducing the acidulated sludge onto the surface of a non-mechanical substantially horizontal filtering medium;

(c) filtering a portion of the liquid component through the solids component on the filtering medium and decanting a portion of the liquid component from above the solids component yielding both a recovered coagulant filtrate and a recovered coagulant supernatant, both comprising (i) a recovered soluble form of the coagulant that is a more efficient coagulant, on a mole basis, than the commercially available coagulant and (ii) some acid soluble impurities; and leaving on the surface of the non-mechanical substantially horizontal filtering medium a solids cake comprising unsolubilized hydroxide form of the coagulant, other suspended matter, and entrained liquid component;

(d) retaining a portion of either the recovered coagulant filtrate or the recovered coagulant supernatant or both and recycling at least a portion of the retained portion, the recycled portion being less than the mole equivalent of the commercially available coagulant which would otherwise be required to effect flocculation of solids in untreated raw water; and (e) discarding an amount of either the recovered coagulant filtrate or the recovered coagulant supernatant or both sufficient to ensure that the concentration of acid soluble impurities recovered along with the acid soluble form of the coagulant does not exceed an acceptable maximum contaminant level for the water treated with the recycled portion;

the amount of the hydroxide form of the coagulant that is converted to an acid soluble form being equal or less than the amount necessary to ensure that the concentration of acid soluble impurities in the recycled portion does not exceed the acceptable maximum contaminant level for the water treated with the recycled portion.

* * * * *